(12) United States Patent
Hui-Chu et al.

(10) Patent No.: US 7,284,252 B2
(45) Date of Patent: Oct. 16, 2007

(54) LOCKING MECHANISM FOR EXTERNAL OPTICAL DISK DRIVE

(75) Inventors: Huang Hui-Chu, Hsinchu (TW); Kuo Sheng-Jung, Hsinchu (TW)

(73) Assignee: Lite-On IT Corporation, Taipei (TW)

( * ) Notice: Subject to any disclaimer, the term of this patent is extended or adjusted under 35 U.S.C. 154(b) by 574 days.

(21) Appl. No.: 10/889,389

(22) Filed: Jul. 12, 2004

(65) Prior Publication Data

US 2005/0073810 A1    Apr. 7, 2005

(30) Foreign Application Priority Data

Oct. 6, 2003    (TW)    ................................. 92127716 A (51) Int. Cl.
   *G11B 33/02*    (2006.01)

(52) U.S. Cl. ..................................................... 720/657

(58) Field of Classification Search ................ 720/654, 720/685, 655, 656, 657
   See application file for complete search history.

(56) References Cited

U.S. PATENT DOCUMENTS

| 7,000,309 | B1 * | 2/2006 | Klassen et al. | .......... 29/603.03 |
| 2003/0152010 | A1 * | 8/2003 | Liao et al. | ................. 369/75.1 |
| 2004/0076102 | A1 * | 4/2004 | Huang | ........................ 369/75.1 |
| 2005/0268314 | A1 * | 12/2005 | Dai | ............................. 720/657 |
| 2006/0026613 | A1 * | 2/2006 | Mao et al. | .................. 720/655 |

* cited by examiner

*Primary Examiner*—Allen Cao
(74) *Attorney, Agent, or Firm*—Thomas, Kayden, Horstemeyer & Risley (57) ABSTRACT

The present invention provides a locking mechanism for an external optical disk drive. The locking member is positioned on the upper housing to release or lock the cover. The cover has a projection extending downwardly from its front end and three journals are integrally formed with the cover. Three grooves are defined on the upper housing and sized to receive three corresponding journals of the cover. Besides, both ends of a resilient member are respectively adapted to be received in hubs. The resilient member is restrained by the upper housing and the hubs. Viscous material can be applied between the hubs and the shallow shaft. When the locking member disengages from the opening of the cover, the cover will be opened smoothly due to the viscosity of the viscous material.

16 Claims, 11 Drawing Sheets

LOCKING MECHANISM FOR EXTERNAL OPTICAL DISK DRIVE

BACKGROUND OF THE INVENTION

1. Field of the Invention

The invention relates to a locking mechanism for an external optical disk drive, and in particular to a locking mechanism for releasing or locking a cover of an external optical disk drive.

2. Description of the Prior Art

Optical disk drives are becoming more popular in the market, and the optical disk drives are considered as standard equipment on personal computer for several years. Generally speaking, optical disk drives are used to read information stored on optical disks. Examples of optical disk drives are known as compact disk drives (CD-ROM drives) and digital versatile disk drives (DVD-ROM drives) in prior art. Some optical disk drives have the additional capability of being able to write data onto an optical disk, i.e., CD-RW drivers. Optical disk drives are used in music and video playback and are implemented in recording devices and other electronic devices.

Figure 1:
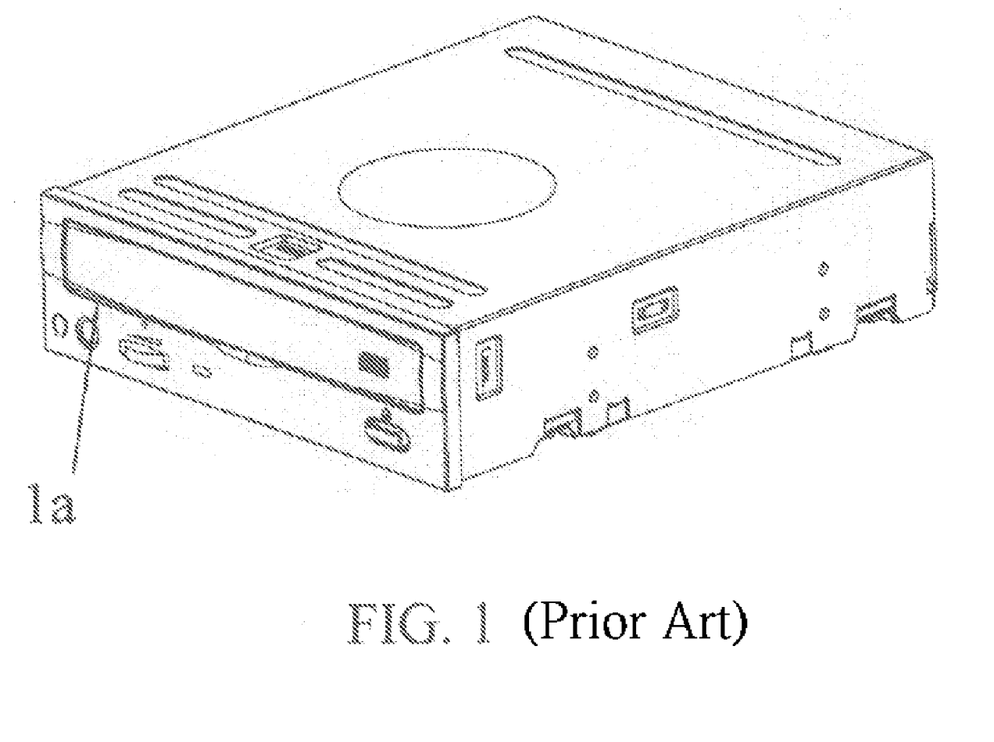
FIG. 1 is a perspective view of a conventional disk-tray optical disk drive.

In prior art, the conventional disk drives are categorized into two types: disk-tray disk drive and cover-lifting disk drive. Regarding the disk-tray type disk drive, optical disk can be placed on the disk tray when a disk tray motor pulls the disk tray to what so called pull-out position. As shown in FIG. 1, the disk-tray optical disk drive includes a rectangular-shaped slit 1a surrounding the disk tray. However, due to the slit 1a, the disk tray may be jammed by foreign objects during loading and ejection of the optical disk.

Another type of optical disk drives has an independent housing (often referred as an external type) and is coupled to a host computer via a signal cable to transmit data to the host computer. In addition, the external optical disk drive may transmit music data to the users via an earphone cable.

Figure 2:
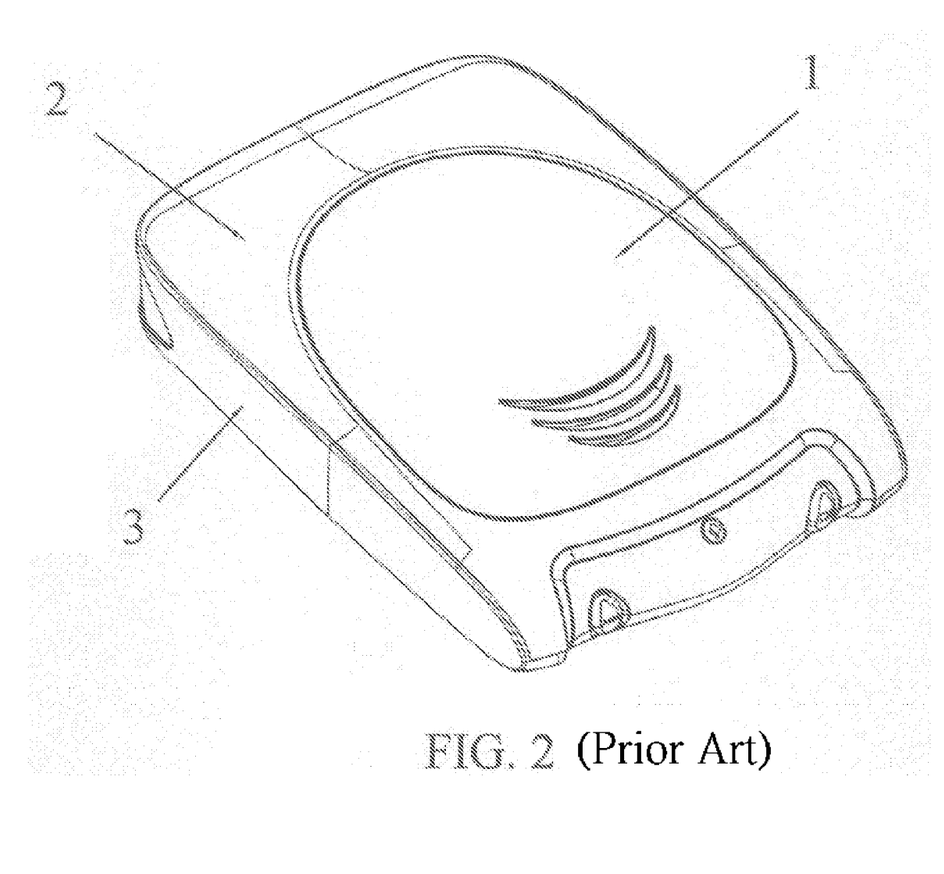
FIG. 2 is a perspective view of a conventional external optical disk drive.

FIG. 2 illustrates a conventional external optical disk drive. Referring to FIG. 2, the conventional external optical disk drive includes a cover 1, an upper housing 2 and a lower housing 3.

Figure 3:
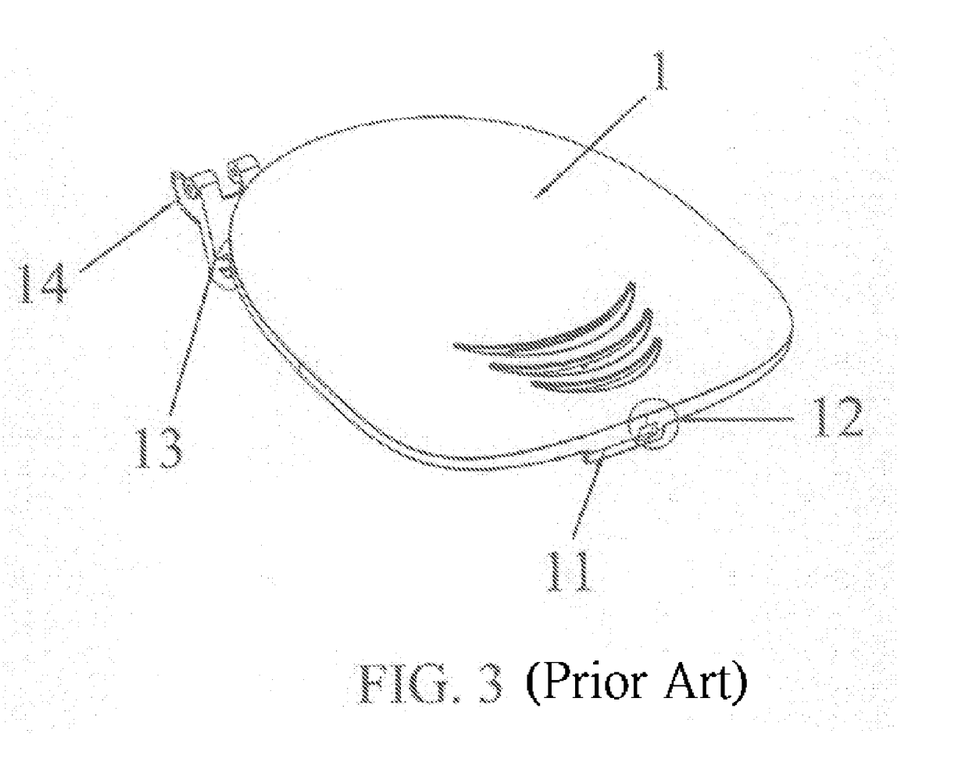
FIG. 3 is a perspective view of a cover for use in the conventional external optical disk drive of FIG. 2.

FIG. 3 illustrates a cover of the conventional external optical disk drive of FIG. 2. Referring to FIG. 3, the cover 1 includes a protrusion 11 extending downwardly from its front end, and an opening 12 is defined in the protrusion 11. A rotary shaft 13 is integrally formed at the rear edge of the cover 1, and a gear rack 14 is integrally formed with the rotary shaft 13 of the cover 1.

Figure 4:
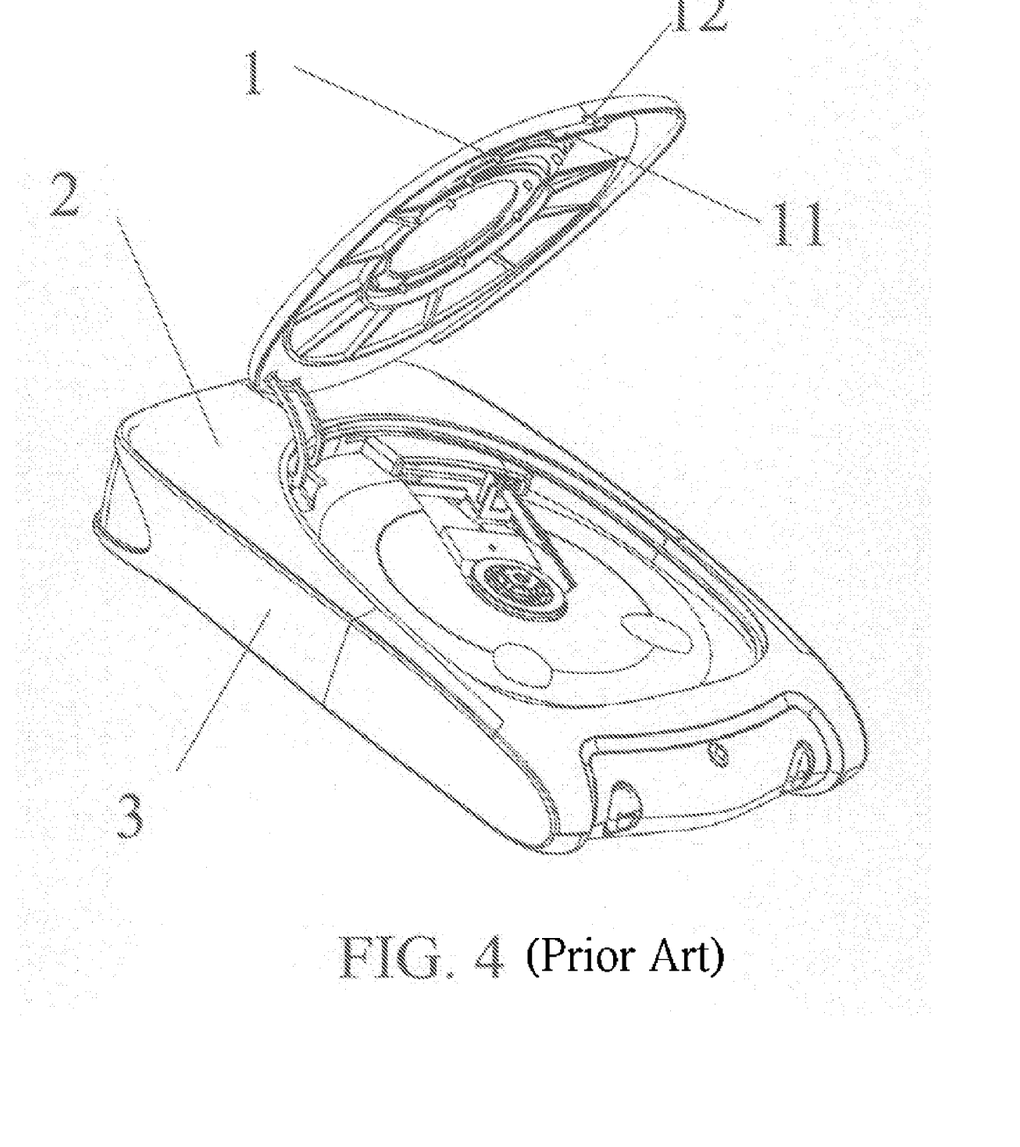
FIG. 4 is a perspective view of a conventional external optical disk drive of FIG. 2 with the cover opened.

FIG. 4 illustrates the conventional external optical disk drive of FIG. 2 with the cover 1 opened. Referring to FIG. 4, the upper housing 2 is positioned at the lower housing 3. The rotary shaft 13 of the cover 1 is pivotally coupled to the upper housing 2 so that the cover 1 can be pivoted with respect to the upper housing 2 and the lower housing 3. To effectively utilize the space occupied by the external optical disk drive, the rotary shaft 13 is not located at a central portion of the rear edge of the cover 1.

Figure 5:
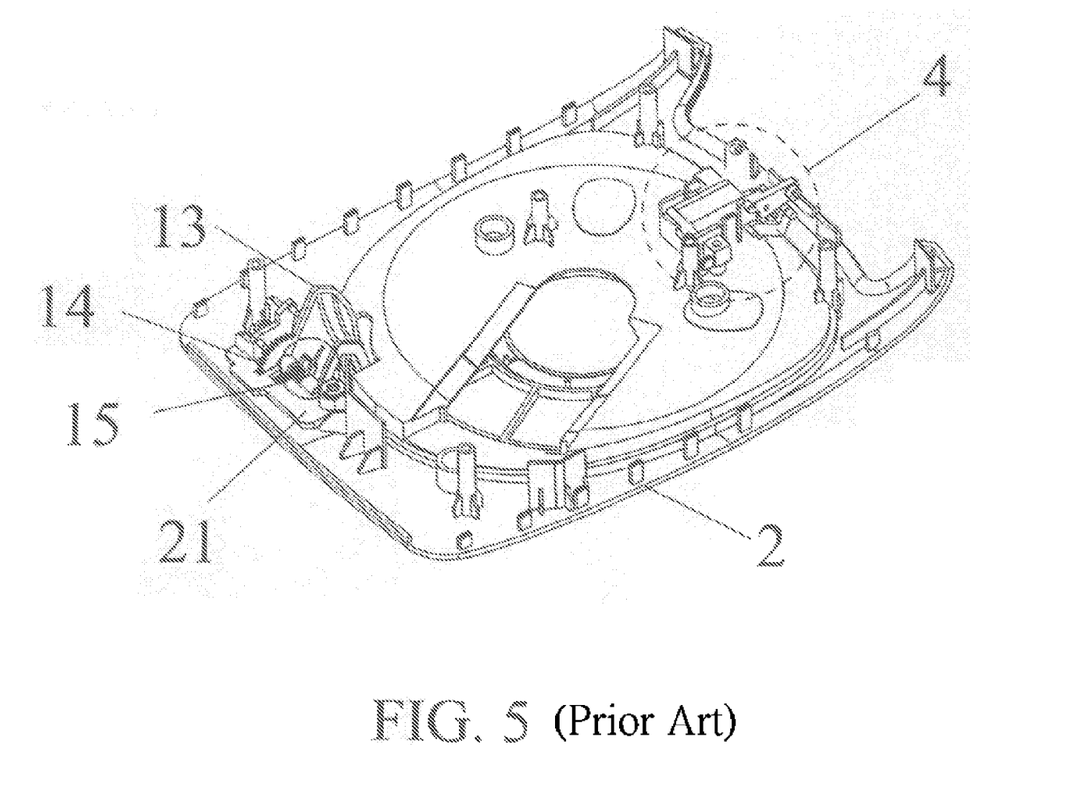
FIG. 5 is a perspective view of an upper housing of the conventional external optical disk drive of FIG. 2 as viewed from the bottom of an upper housing.

FIG. 5 is a perspective view of assembly of the cover 1 and the upper housing 2 of the conventional external optical disk drive as viewed from the bottom of the upper housing 2. As shown in FIG. 5, a locking member 4 indicated by phantom line is defined on the bottom surface of the upper housing 2. When the cover 1 is closed, the locking member 4 is used to engage with the opening 12 of the protrusion 11 for the purpose of locking the cover 1. Further referring to FIG. 5, a mounting member 21 is positioned on the bottom of the upper housing 2 and is adapted to receive the rotary shaft 13 of the cover 1 and an elastic member 15. The two ends of the elastic member 15 are respectively restrained by the mounting member 21 and the rotary shaft 13 of the cover 2. The elastic member 15 is of metallic (plastic) and can be a torsion spring. Besides, the gear rack 14 is adapted to engage with a spur gear (not shown) of the upper housing 2, so the cover 1 can be pivoted about the mounting member 21 because of a torsional moment of the elastic member 15.

However, as described above, the torsional moment of the elastic member 15 is not applied at the central portion of the rear edge of the cover 1, thereby causing the deformation of the cover 1. Even worse, deformation of the cover 1 may be aggravated during shipping when the environmental temperature is high, thereby rendering the optical disk drive unusable.

Accordingly, there is a need to develop a locking mechanism for use in an external optical disk drive.

SUMMARY OF THE DISCLOSURE

It is an object of the present invention to provide a locking mechanism for an external optical disk drive that can effectively eliminate the deformation of a cover.

It is another object of the present invention to provide an external optical disk drive having a locking mechanism that is used to release or lock a cover smoothly.

In order to accomplish the object of the present invention, the present invention provides a locking mechanism for use in the optical disk drive. The locking member is positioned on the upper housing to release or lock the cover. The cover has a projection extending downwardly from its front end and three journals are integrally formed with the cover. Three grooves are defined on the upper housing and sized to receive three corresponding journals of the cover. Besides, both ends of a resilient member are respectively adapted to be received in hubs. The resilient member is restrained by the upper housing and the hubs. Viscous material is applied between the hubs and the shallow shaft. When the locking member disengages from the opening of the cover, the cover will be opened smoothly and the journals of the cover are subjected to substantially even torsional moment due to the viscosity of the viscous material and resilience of the resilient member.

BRIEF DESCRIPTION OF DRAWINGS

The present invention can be fully understood from the following detailed description and preferred embodiment with reference to the accompanying drawings in which.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the embodiments of the present invention are described below in connection with external DVD-ROM drives, the present invention can be applied to all optical disk drive, including but not limited to CD-ROM drives, CD-RW drives, DVD-RAM drives, DVD-RW drives, DVD+RW drives, COMBO drives, car audio players, external drives, as well as all other optical media recorders and players.

Figure 6:
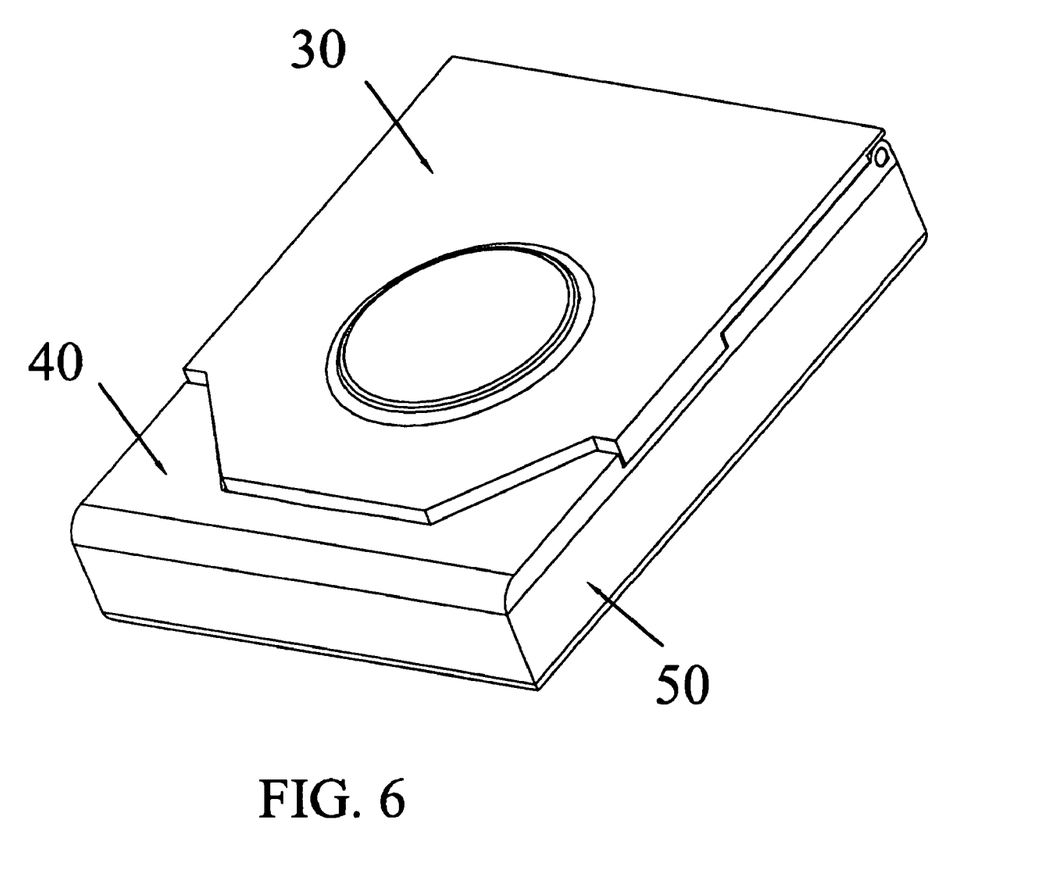
FIG. 6 is a perspective view of an external optical disk drive in accordance with the present invention.
Figure 7:
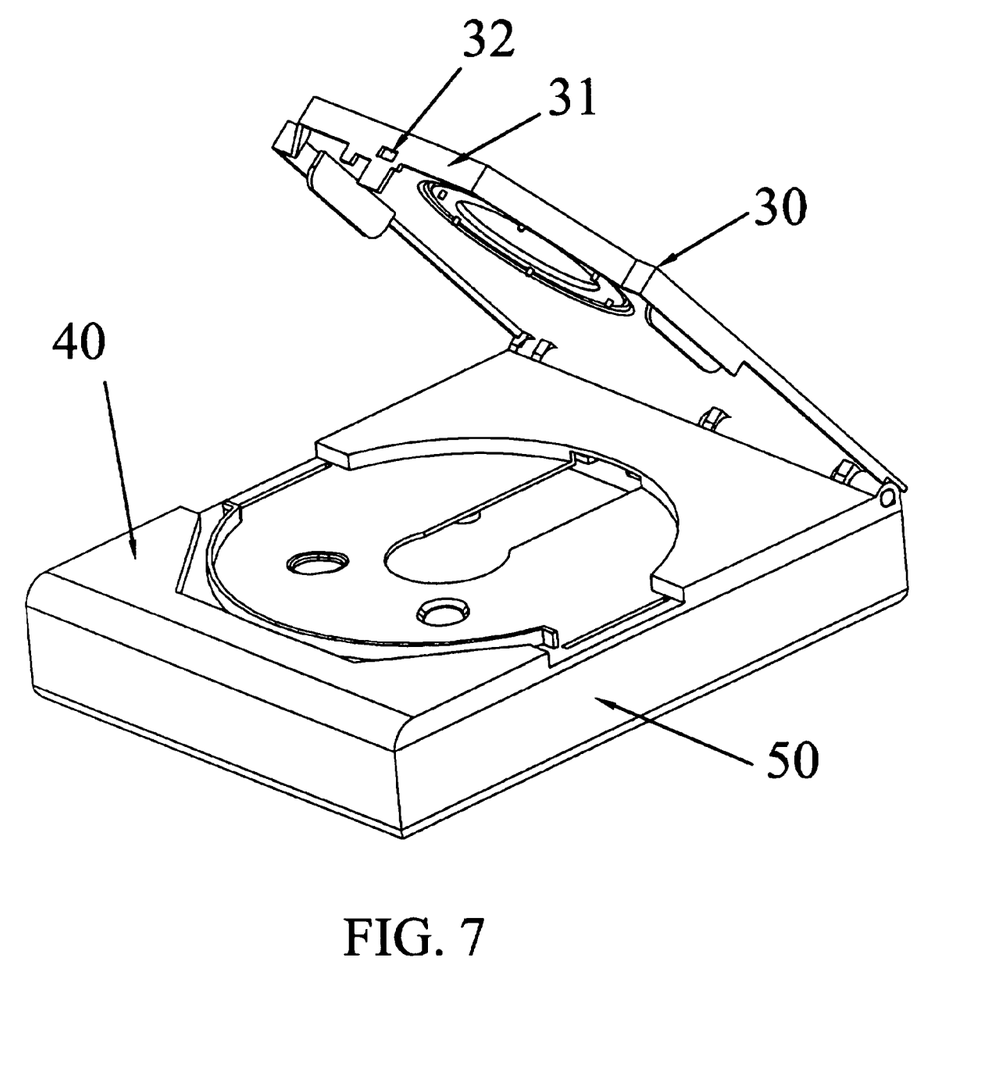
FIG. 7 is a perspective view of an external optical disk drive of FIG. 6 with the cover opened.

FIG. 6 illustrates an external optical disk drive in accordance with the present invention. FIG. 7 illustrates an external optical disk drive of FIG. 6 with the cover 30 opened. For simplicity, a playback unit is removed from the external optical disk drive, and the description about the playback unit is omitted. Referring to FIG. 6, the external optical disk drive of the present invention includes a cover 30, an upper housing 40 and a lower housing 50. Referring to FIG. 7, the cover 30 includes a protrusion 31 extending downwardly from its front end, and an opening 32 is defined in the protrusion 31. In addition, the upper housing 40 is positioned at the lower housing 50. Thus, the cover 30 can be pivoted with respect to the upper housing 40 and the lower housing 50 while the cover 30 is opened.

Figure 8:
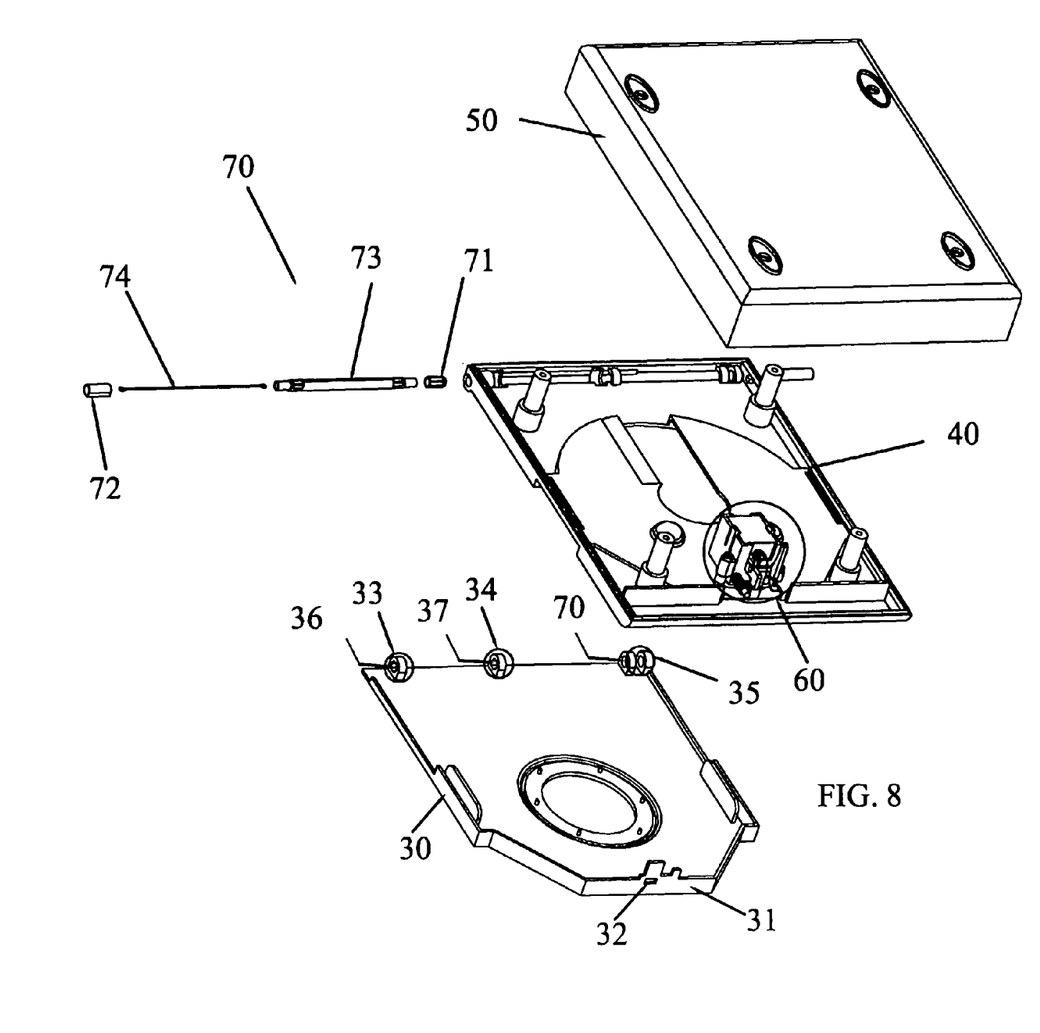
FIG. 8 is an exploded perspective view of an external optical disk drive of FIG. 6 as viewed from the bottom of a lower housing.
Figure 9:
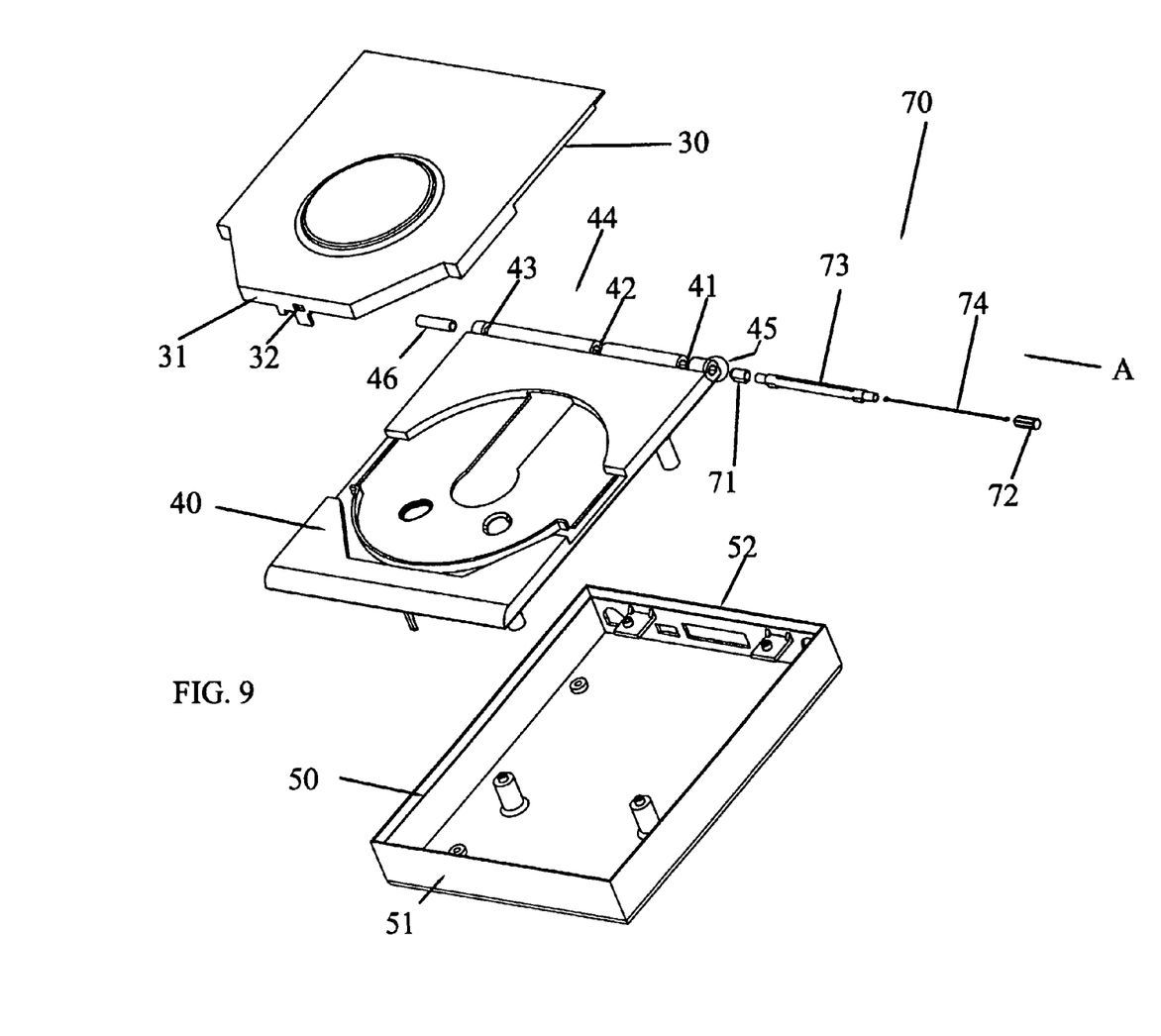
FIG. 9 is an exploded perspective view of an external optical disk drive of FIG. 6.

FIGS. 8 and 9 are exploded perspective views of the external optical disk drive in accordance with the present invention. FIGS. 8 and 9 best illustrate the interconnections of various components of the present invention. Referring to FIG. 8, the external optical disk drive of the present invention has a locking member 60 that is indicated by phantom line and is defined on the bottom surface of the upper housing 40. The external optical disk drive also has a pivotal member 70 including hubs 71 and 72, a hallow shaft 73 and a resilient member 74. The resilient member 74 can be made of, but not limited to metal, plastic, stainless steel or brass etc. As described above, the lower housing 50 and the locking member 60 of the present invention can be the same as the lower housing 3 and the locking member 4 of the conventional external optical disk drive. When the cover 30 is closed, the locking member 60 is used to engage with the opening 32 of protrusion 31 for the purpose of locking the cover 30.

Further referring to FIG. 8, three journals 33, 34 and 35 are defined on the bottom surface of the cover 30 and integrally formed with the cover 30. Referring to FIG. 9, a rotary socket 44 is integrally formed with the upper housing 40 and positioned at the rear end of the upper housing 40. Three grooves 41, 42 and 43 of the rotary socket 44 correspond to the journals 33, 34 and 35 of the cover 30. As used herein, the term "front" shall mean adjacent or towards a front wall 51 of the lower housing 50, and the term "rear" shall mean adjacent or towards a rear wall 52 of the lower housing 50.

Figure 10:
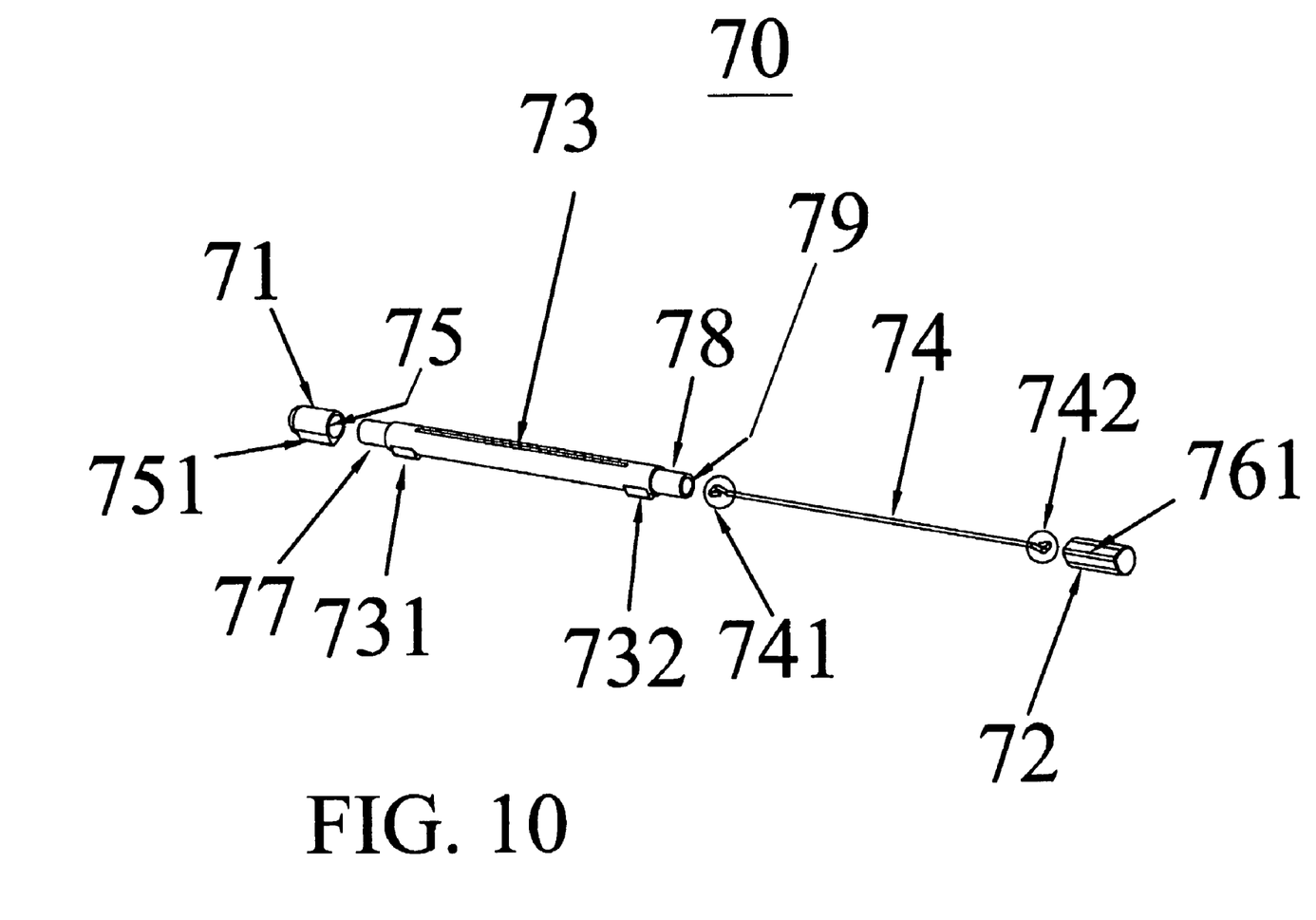
FIG. 10 is an exploded perspective view of an pivotal member of FIG. 6.

FIG. 10 is an expanded perspective view of the pivotal member 70 in accordance with the present invention. The hubs 71 and 72 can be identical, and the hub 71 has a hole 75 that is sized to receive an extension 77 of the hallow shaft 73. Like the hub 71, the hub 72 also has a hole 76 that is sized to receive an extension 78 of the hallow shaft 73. The resilient member 74 is substantially straight and has two triangle-shaped portions 741 and 742, and the hallow shaft 73 is sized to receive the resilient member 74.

Figure 11:
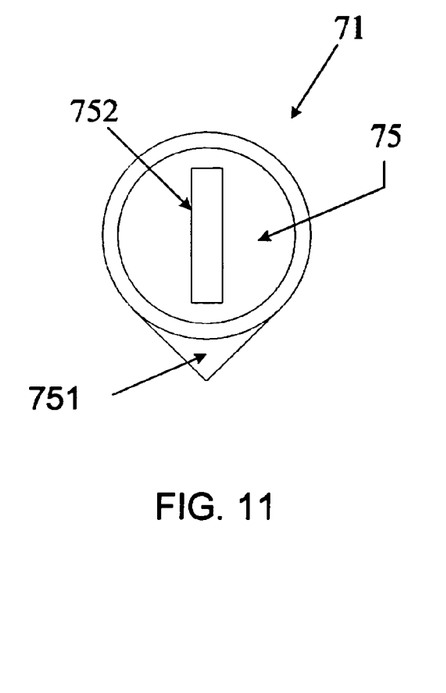
FIGS. 11 and 12 are cross-sectional view of hubs of the pivotal member of FIG. 10.
Figure 12:
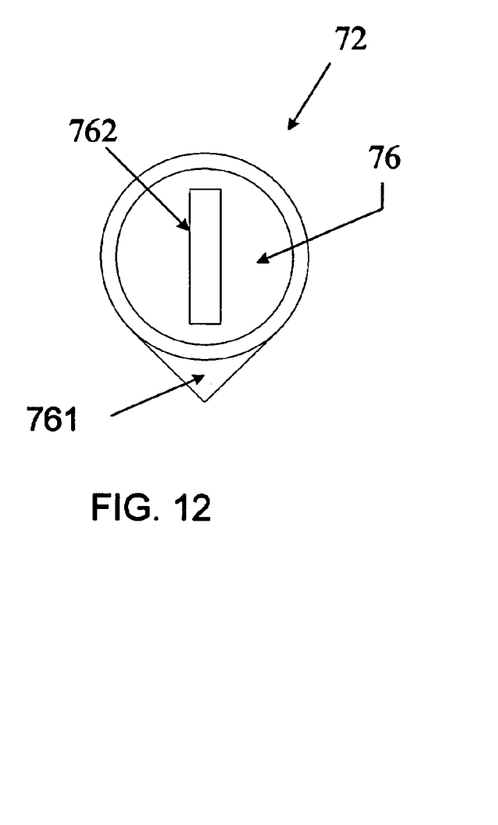

FIG. 11 is a cross sectional view of the hub 71 of the FIG. 10 as viewed from arrow A. Referring to FIG. 11, a slot 752 is defined within the hole 75 and integrally formed with the hub 71. Besides, a protrusion 751 is integrally formed with the hub 71. Like the hub 71, a slot 762 is defined within the hole 76 and integrally formed with the hub 72 as shown in FIG. 12. Besides, a protrusion 761 is integrally formed with the hub 72.

Figure 13:
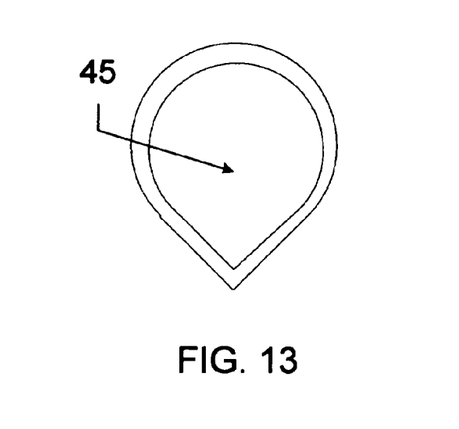
FIG. 13 is a cross-sectional view of a hole of the upper housing of FIG. 6.

Further referring to FIG. 9, a hole 45 is integrally formed with the rotary socket 44 and is indicated by a solid line. Besides, the cross section of the hole 45 of the rotary socket 44 is substantially same as that of the hubs 71 and 72, and the hole 45 of the rotary socket 44 is sized to receive the pivotal member 70. The cross-section view of the hole 45 of the rotary socket 44 is shown in FIG. 13, and cross-section views of holes 36 and 37 of the journals 33 and 34 are substantially same as that of the hole 45. In accordance with the present invention, the pivotal member 70 can be inserted into the hole 45 of the upper housing 40 in the direction of arrow A of FIG. 8. Thus, the cover 30 can be pivoted with respect to the upper housing 40 and the lower housing 50 by the pivotal member 70.

To insert the pivotal member 70 into the hole 45 of the rotary socket 44 of the upper housing 40, the resilient member 74 is fitted to the hole 79 of the hallow shaft 73 along the direction of arrow A of FIG. 10. The slot 752 of the hub 71 is sized to receive the triangle-shaped portion 741 of the resilient member 74, and the extension 77 of the hallow shaft 73 is fitted to the hole 75 of the hub 1. Then, the triangle-shaped portion 742 of the resilient member 74 is fitted to the slot 762 of the hub 72, and the extension 78 of the hallow shaft 73 is fitted to the hole 76 of the hub 72. Before the pivotal member 70 is fitted to the hole 45 of the rotary socket 44 of the upper housing 40, the three journals 33, 34 and 35 of the cover 30 are positioned on corresponding three grooves 41, 42 and 43 of the upper housing 40.

Furthermore, the protrusion 751 of the hub 71 can be in alignment with protrusions 731 and 732 of the hallow shaft 73, and the protrusions 731 and 732 respectively correspond the grooves 41 and 42 of the upper housing 40. When the cross section of the hub 71 matches that of the hole 45 of the rotary socket 44 of the upper housing 40, the pivotal member 70 can be fitted to the hole 45 of the upper housing 40 along the direction of arrow A of FIG. 9. Before the hub 72 of the pivotal member 70 is fitted to the hole 45 of the rotary socket 44 of the upper housing 40, the hub 72 is clockwise rotated around the axis of the arrow A and aligns with the hole 45 again. Thus, a torsional moment of the resilient member 74 is produced during the installation of the pivotal member 70. The journals 33 and 34 of the cover 30 hold the protrusions 731 and 732 of the hallow shaft 73, and the protrusions 731 and 732 can respectively rotate within the grooves 41 and 42 due to the resilience of the resilient member 74. Then, referring to FIGS. 8 and 9, a pin 46 is fitted to a hole 38 of the journal 35 of the cover 30 and the hole 45 of the rotary socket 44 of the upper housing 40, thereby causing the cover 30 being pivotally coupled to the upper housing 40.

Further referring to FIGS. 8 and 9, when the cover 30 is closed, the locking member 60 is used to engage with the opening 32 of the protrusion 31 for the purpose of locking the cover 30. When the cover 30 is released by the locking member 60, the hallow shaft 73 together with the cover 30 will be pivoted around the axis of the arrow A because of the resilience of the resilient member 74. Because the hubs 71 and 72 are restrained by the rotary socket 44 of the upper housing 40, the upper housing 40 will not be rotated when the cover 30 is opened. In addition, viscous material can be applied on the extensions 77 and 78 of the hallow shaft 73. Viscous material can be made of, but not limited to grease or lubricant. As described above, when the cover 30 is released by the locking member 60, the cover 30 substantially pivots at a slower speed because of viscosity of viscous material. In this regard, when user would like to open the cover 30 of the optical disk drive, the cover 30 cannot cause potential injury to the user.

While the invention has been described with reference to the preferred embodiments, the description is not intended to be construed in a limiting sense. It is therefore contemplated that the appended claims will cover any such modifications or embodiments as may fall within the scope of the invention defined by the following claims and their equivalents.

What is claimed is:

1. A locking mechanism for an external optical disk drive with a cover and an upper housing, comprising:
    a pivotal member, having a resilient member;
    a rotary socket, integrally formed with the upper housing and sized to receive the pivotal member; and
    a locking member, positioned on the upper housing and for engaging with the cover;
    wherein the cover is closed because the locking member is used to engage with the cover, and wherein the cover is opened because of resilience of the resilient member of the pivotal member.

2. The locking mechanism as claimed in claim 1, wherein the resilient member is made of metal.

3. The locking mechanism as claimed in claim 1, wherein the resilient member is made of plastic.

4. The locking mechanism as claimed in claim 1, wherein the resilient member is made of stainless steel.

5. The locking mechanism as claimed in claim 1, further comprising plurality of grooves that are integrally formed with the upper housing and sized to receive corresponding journals of the cover.

6. The locking member as claimed in claim 1, wherein the cover is pivoted with respect to the upper housing by the pivotal member.

7. A locking member for an external optical disk drive with a cover and an upper housing, comprising:
    a pivotal member, having a resilient member, a shallow shaft and two hubs;
    a rotary socket, integrally formed with the upper housing and sized to receive the pivotal member; and
    a locking member, positioned on the upper housing and used to engaging with the cover;
    wherein the cover is opened and the hubs is rotatably mounted to the shallow shaft, the cover is pivoted with respect to the upper housing because of resilience of the resilient member of the pivotal member.

8. The locking member as claimed in claim 7, wherein the resilient member is made of metal.

9. The locking mechanism as claimed in claim 7, wherein the resilient member is made of plastic.

10. The locking mechanism as claimed in claim 7, wherein the resilient member is made of stainless steel.

11. The locking mechanism as claimed in claim 7, further comprising viscous material that is applied between the hubs and the shallow shaft and when the locking member disengages from the cover, the cover will be opened smoothly due to the viscosity of the viscous material.

12. The locking mechanism as claimed in claim 11, wherein viscous material is grease of lubricant.

13. An external optical disk drive, comprising:
    a lower housing;
    an upper housing, positioned at the lower housing;
    a cover, having plurality of journals;
    a locking member, positioned on the upper housing and used to engaging with the cover;
    a pivotal member, having a resilient member, a shallow shaft and two hubs;
    a rotary socket, integrally formed with the upper housing and sized to receive the pivotal member; and
    a locking member, positioned on the upper housing and used to engaging with the cover;
    wherein the cover is open and the hubs is rotatably mounted to the shallow shaft, the cover is pivoted with respect to the upper housing because of resilience of the resilient member of the pivotal member.

14. The external optical disk drive as claimed in claim 13, wherein the elastic member is of plastic and is a torsion spring.

15. The external optical disk drive as claimed in claimed 13, further comprising viscous material that is applied between the hubs and the shallow shaft and when the locking member disengages from the cover, the cover will be opened smoothly due to the viscosity of the viscous material.

16. The external optical disk drive as claimed in claimed 15, wherein viscous material is grease or lubricant.

* * * * *